Aug. 22, 1944.    R. LEE ET AL    2,356,166
PROTECTIVE MEANS FOR ELECTRICAL CONTACTS
Filed Aug. 17, 1942    2 Sheets-Sheet 1
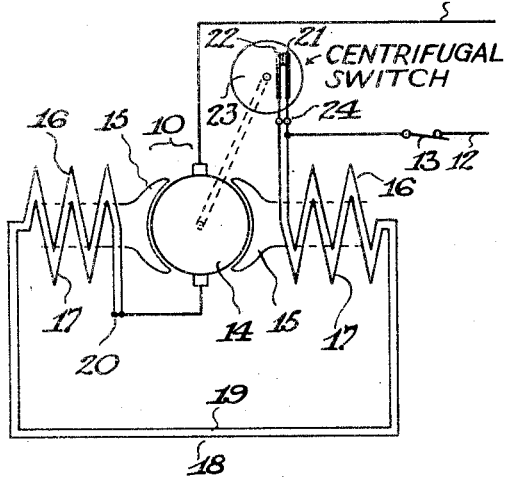
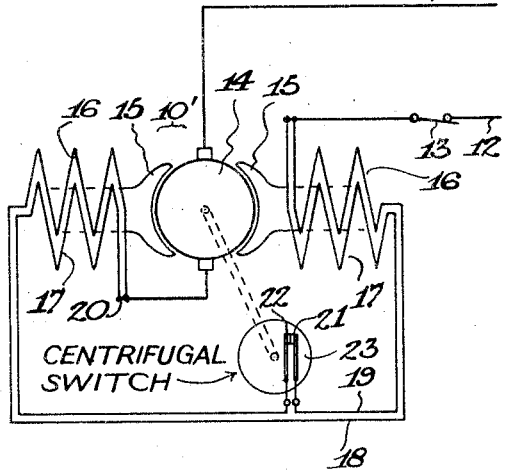
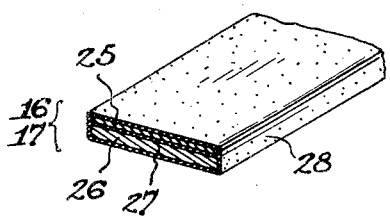
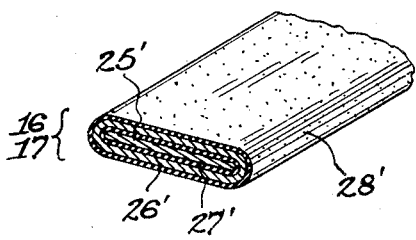
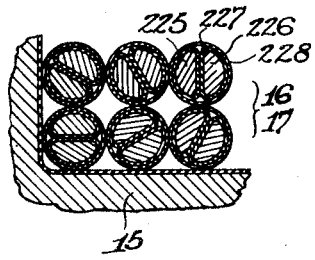
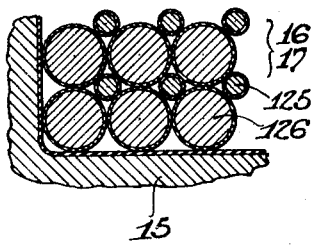
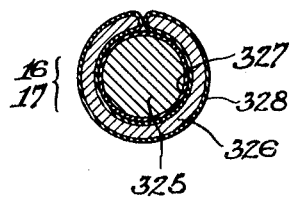
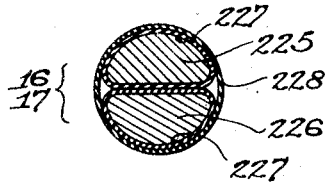
INVENTORS
ROYAL LEE
AND FRED E. BROBERG
BY Christopher L. Waal
ATTORNEY

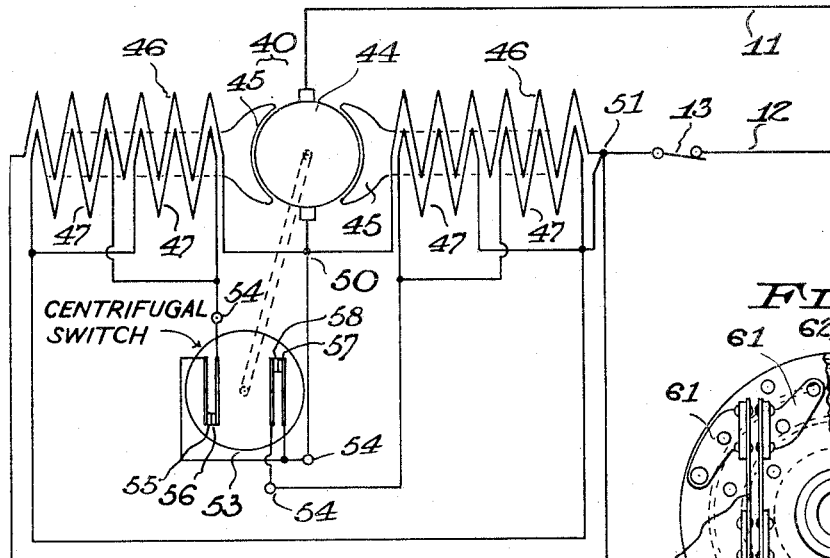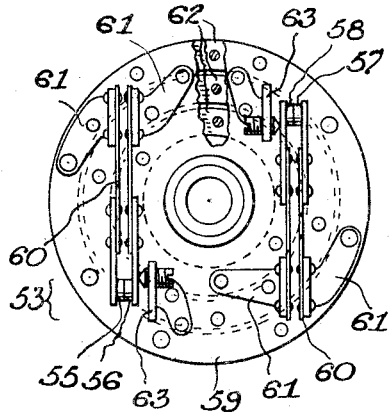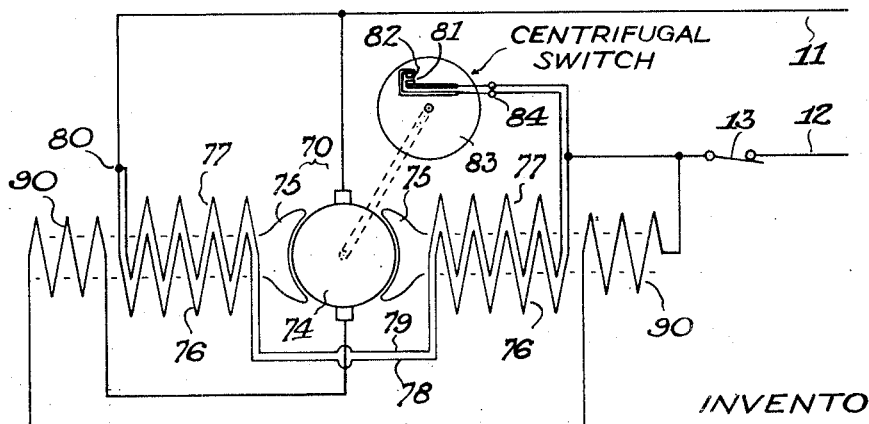

Patented Aug. 22, 1944

2,356,166

UNITED STATES PATENT OFFICE 2,356,166

PROTECTIVE MEANS FOR ELECTRICAL CONTACTS

Royal Lee, Milwaukee, and Fred E. Broberg, Racine, Wis., assignors to Lee Engineering Research Corporation, Milwaukee, Wis., a corporation of Wisconsin Application August 17, 1942, Serial No. 455,076

17 Claims. (Cl. 171—222)

The present invention relates to electrical systems, and more particularly to protective arrangements for contacts in such systems.

Switches of the vibratory or periodically operating type have been used in various electrical systems, including regulator systems for controlling the speed of electric motors and the voltage of generators. For speed regulation of small electric motors, centrifugal governor switches have been used to a considerable extent. In order to protect the switch contacts from damage by sparking or arcing and to limit induced voltages, it has been customary to shunt the switches with spark suppressing means such as condensers and resistors.

An object of the invention is to provide an electrical system, such as a speed regulating system for an electric motor, having improved and simplified spark suppressing means for electric contacts in the system.

Another object of the invention is to provide an electrical system in which inductive windings, such as the windings of an electric motor, are so arranged as to form protective means for the contacts.

A further object is to provide an improved contact protecting electrical system, such as a motor speed regulator system, which is capable of operation on either alternating current or direct current.

The invention further consists in the several features hereinafter described and claimed.

In the accompanying drawings, illustrating certain embodiments of the invention, Fig. 1 is a diagrammatic representation of a motor speed regulating system arranged in accordance with the invention to protect electrical contacts in the system;

Fig. 2 is a diagrammatic representation of a modified form of motor speed regulating system;

Fig. 3 is a detail sectional view of a two-conductor cable for the field windings of the motor;

Fig. 4 is a detail sectional view of a modified form of two-conductor cable;

Fig. 5 is a transverse sectional view of a part of a motor field winding having two coils formed by round wires;

Fig. 6 is a view similar to Fig. 5 but showing another modified form of two-conductor cable for the winding;

Fig. 7 is a transverse sectional view of the two-conductor cable of Fig. 6;

Fig. 8 is a transverse sectional view of a further modified form of two-conductor cable;

Fig. 9 is a diagrammatic representation of another modified form of motor speed regulating system;

Fig. 10 is a detail view of a governor switch for the system of Fig. 9, parts being broken away, and Fig. 11 is a diagrammatic representation of still another form of motor speed regulating system.

In that form of the invention shown in Fig. 1 of the drawings, 10 designates an electric motor of the series or universal type adapted for operation on either direct current or alternating current from line conductors 11 and 12, the latter being provided with a control switch 13. The motor includes an armature 14 rotatable between field poles 15, the magnetic structure of the motor being of conventional type.

In carrying out the invention, each field pole is provided with a pair of field coils 16 and 17 which preferably are additive in their magnetizing effect. The corresponding field coils on the two field poles are here shown to be connected in series by conductors 18 and 19, and the adjacent terminals of the two coils on one field pole are connected to each other at 20. The junction 20 is connected to one of the armature brushes, and the other armature brush is connected to the line conductor 11. The terminals of the coils 16 and 17 on the other field pole are connected to the contacts 21 and 22 of a speed-regulating governor switch 23, preferably of any well known centrifugal type, this switch being operated by the motor. The switch contacts may be rotative or non-rotative, as is well understood in this art. In the case of a governor switch with rotative contacts the current is conducted to the contacts by the usual brushes and slip rings, the brush contacts being indicated at 24. The switch contact 21 and the connected end of the field coil 16 are connected to the line conductor 12, and during the periods when the governor switch is closed the end of the associated field coil 17 is also connected, through the switch, to the line conductor 12. During the operation of the motor the field coils 16 remain continuously in circuit, while the circuit through the field coils 17 is intermittently broken at the centrifugal switch. The contacts preferably are formed of a resistant metal such as tungsten, although in some cases other suitable metals, such as silver or platinum, may be used.

The field coils 16 and 17 on each pole piece are closely coupled, as by forming them in alternate layers or sections and preferably by simultaneously winding two adjacent conductors 25 and 26, Fig. 3, insulated from each other, so as to provide a substantial electrostatic capacity between the conductors. To further enhance the capacity effect, the conductors are in the form of metal ribbons placed face to face and separated by a thin insulating strip or film 27, as of varnish or resin, the assembled ribbon conductors being enclosed by an insulating sheath or covering 28, so as to form a flat cable. In certain cases the two conductors forming the field coils may be of equal cross-sectional area and resistance, but in general it is desirable to make the conductors of unequal resistance, the conductor 25 forming the field windings 16 preferably having the higher resistance, so as to permit operation of the motor over a wide range of speed and load. The conductors preferably are formed of a metal with good electrical conductivity, such as copper or silver or silver-coated copper. In some cases the field coils 16 and 17 may have different numbers of turns and only parts of the coils may be closely coupled, these parts being at the switch-connected ends of the coils.

The modified form of two-conductor cable shown in Fig. 4 comprises a metal ribbon 25' partially or completely enclosed by a metal ribbon 26', the inner and outer ribbons being separated by an insulating strip or film 27', and the assembly being enclosed by an insulating sheath or covering 28'. This arrangement of the conductors increases the electrostatic capacity. The inner ribbon may form either of the field coils 16 and 17, and the outer ribbon may form either an open or closed loop about the inner ribbon.

In the further modification shown in Fig. 5, a pair of ordinary round insulated wires 125 and 126 form the field coils 16 and 17, respectively, the two wires being wound in parallel.

The electric motor above described will operate on either direct current or alternating current, whichever is available. In operation, the motor current flows through the armature 14 and the series field windings formed by the coils 16 and 17. A part of the motor current passes through the field coils 17 and centrifugal switch contacts 21 and 22 when the latter are closed, and the other part of the motor current passes through the field coils 16 and does not pass through the switch contacts. When the motor rises to a critical speed the governor switch contacts open, thus interrupting the flow of current through the field coils 17, the motor current being then reduced to that flowing through the field coils 16. Thereupon the motor speed drops slightly, causing the switch contacts to close and restoring the flow of current through field coils 17. The motor speed then rises slightly, causing the switch contacts to reopen, and the cycle of operation is repeated, the result being that the motor speed is maintained within close limits. In practice one or both of the governor switch contacts vibrate at a relatively high frequency, say from 50 to 300 cycles per second, so as to obtain good speed regulation. If it is desired to have the motor operate at different selected speeds, the governor switch may be of any suitable adjustable type.

Heretofore it has been usual to shunt governor or regulator switches with protective devices, such as condensers and resistors, so as to prevent deterioration or destruction of the switch contacts. In some instances it has been necessary to provide additional space in or near the motor to mount these protective devices. By means of the present invention the switch contacts are adequately protected without normally requiring the use of auxiliary shunting devices, as the field windings themselves are so arranged and connected as to protect the contacts, these windings having both a condenser effect and a resistance effect. In the case of a governor switch with brush gear, the windings will also have a protective influence on the brush contacts. The relation of the motor windings is such that there will be no interference with the efficient operation of the motor on either alternating current or direct current. Contact protection is particularly important on direct current operation because of the tendency of excessive sparking to cause transfer of metal from one contact to the other. A slight sparking is ordinarily unobjectionable and appears to be useful in aiding contact vibration.

In the modified form of motor regulating system shown in Fig. 2, the governor switch is inserted in the conductor 19 connecting the two field coils 17 of the motor 10'. The system of Fig. 2 is otherwise the same as that of Fig. 1 and operates in the same manner. In the system of Fig. 2 the field coils 17 will form choke coils between the governor switch and the line conductors.

In the modified form of field winding shown in Figs. 6 and 7, insulated wires 225 and 226 form a two-conductor cable and are flattened at their adjacent portions to increase the capacitance effect and to improve the space factor. The two wires of the cable are retained in assembled relation in any suitable manner as by an insulating wrapping 228, or merely by effecting adhesion between the insulated wires. For facility in winding, especially in the case of small wire sizes, the cable is approximately circular in cross-section. The cable is conveniently formed by a pair of round wires each having a tough coating 227 of insulating enamel, the two wires being rolled to a flattened shape and pressed together, preferably in a simultaneous operation. For an electric motor intended to operate within a limited range of speed and load, the two wires may be of the same size, as shown. For some circuits, however, the wires may be of different size. In certain cases the wires may have different conductivity to provide a difference in resistance.

In the further modified form of two-conductor cable shown in Fig. 8, a round wire 325 is snugly encased by a metal ribbon or strip 326 insulated therefrom, the wire preferably having a coating 327 of insulating enamel and the ribbon having a similar coating 328. The cable is approximately circular in cross-section to facilitate winding. For a given outside diameter, the cable of Fig. 8 will ordinarily have a greater capacitance effect than the cable of Fig. 7. The outer conductor 326 is shown to form an open loop about the inner conductor, but in some instances it may be closed as in Fig. 4.

In the form of the invention shown in Figs. 9 and 10, the motor 40 is of a series or universal type and is connected to line conductors 11 and 12, the latter having a control switch 13. The motor is here shown to be of the two-pole type and includes an armature 44 rotatable between pole pieces 45.

Each field pole is provided with a field coil 46 and one or more field coils 47, two of the latter being shown. The two field coils 46 are connected in parallel, and the parallel combination thus formed is connected in series with the armature, the point of connection with the armature being indicated at 50. The two field coils 47 on each field pole are connected in parallel and are closely associated with the corresponding field coil 46, as by simultaneously winding two conductors in any one of the various ways shown in Figs. 3 to 8. In the case of two coils 47, one of them is coextensive with one half of the coil 46 and the other is coextensive with the other half of the coil 46. The corresponding terminals of the four field coils 47 have a junction at 51 with the line conductor 12 and terminals of the field coils 46. The other terminals of each pair of field coils 47 are connected to the armature junction 50 through a centrifugal governor switch 53 driven by the motor, one suitable form of switch being shown in Fig. 10. This governor switch has two sets of contacts 55, 56 and 57, 58 with the same speed setting, there being one set of contacts for each pair of field coils 47.

The switch shown in Fig. 10 has a rotatable insulating disk 59 adapted to be mounted on the motor shaft. The contacts are carried by respective leaf springs 60 secured to brackets 61 on one side of the disk, and the other side of the disk has three collector rings 62, the brush contacts being indicated at 54 in Fig. 9. The speed setting of the two switch units is varied by adjusting devices 63 carried on the disk 59. The contacts 55 and 57 are vibratory, while the contacts 56 and 58 are non-vibratory but are displaceable by the adjusting devices 63. The contacts 55 and 57 are connected in common to the armature junction 50 by way of the outer collector ring, and the contacts 56 and 58 are connected to the respective sets of field coils 47 by way of the two inner collector rings.

During the operation of the motor of Fig. 9, the field coils 46 remain continuously in circuit while the circuit through the two sets of field coils 47 is intermittently broken at the two sets of swich contacts. As in the system of Fig. 1, the operation of the governor switch will maintain the motor speed within close limits. The two switch units preferably operate synchronously, but asynchronous operation is also possible as the switch units control separate circuits. The use of two sets of contacts also increases the current-carrying capacity of the switch. The arrangement of Fig. 9 is particularly suitable for low voltage motors, for example 12-volt motors, and also for high voltage heavy duty motors, such as 110-volt motors, as it permits an increase in the number of turns in the field coils to enhance the capacitance effect and incidentally permits the use of smaller wire sizes to facilitate winding of the coils.

In the form of the invention shown in Fig. 11, the numeral 70 designates a direct current motor of the shunt field type. The motor is supplied with current from line conductors 11 and 12 and includes an armature 74 rotatable between pole pieces 75. Shunt field coils 76 and 77 are carried on each of the field poles of the motor. The corresponding field coils on the two field poles are connected in series by conductors 78 and 79, and the adjacent terminals of the two coils are connected to each other at 80. The junction 80 is connected to one of the armature brushes and to the line conductor 11, and the terminals of the field coils 76 and 77 on the other field pole are connected to the contact 81 and 82 of a speed regulating governor switch 83 operated by the motor. The governor switch 83 is similar to that of Fig. 1, except that the contacts are arranged to close upon an increase of motor speed. The brush contacts for the switch are indicated at 84. The contact 81 and the connected end of the field coil 76 are connected to the line conductor 12, and during the periods when the governor switch is closed the end of the field coil 77 is also connected, through the switch, to the line conductor 12. The shunt field coils 76 and 77 are preferably formed by two conductors wound as in the system of Fig. 1. If desired, the motor also may be provided with series field windings 90 to limit the starting current and to increase the starting torque.

In the operation of the motor of Fig. 11, the governor switch contacts engage when the motor speed rises to a critical value, thus permitting current to flow through the shunt field coils 77. Because of the increased field flux, the motor speed drops slightly and the switch contacts then reopen. The motor speed then rises slightly and the cycle of operation is repeated, the result being to maintain the motor speed within close limits.

The shunt field windings are so arranged and connected as to have a protective action on the contacts, similar to that in the system of Fig. 1.

While the invention is particularly adapted for use in protecting electrical contacts in motor speed regulating systems, it is also applicable to the protection of contacts in other electrical systems.

What we claim as new and desire to secure by Letters Patent is:

1. In an electrical system, a circuit having a pair of coil-forming conductors arranged in parallel and adapted to be traversed by electric current, and means for regulating the flow of current in said circuit comprising a switch in series with one of said conductors for interrupting the flow of current through said conductor while the other conductor is in circuit, said conductors being connected together at a distance therealong from said switch and being in close proximity along a substantial portion of their length to have a capacitance effect, said associated conductors forming a spark suppressor for said switch.

2. In an electrical system, a circuit having a pair of coil-forming conductors arranged in parallel and adapted to be traversed by electric current, said conductors being formed of metal ribbons insulated from each other along their length but lying close together face-to-face, and means for regulating the flow of current in said circuit comprising a switch in series with one of said conductors for interrupting the flow of current through said conductor while the other conductor is in circuit, said conductors being connected together at a distance therealong from said switch and having a capacitance effect, and said associated conductors forming a spark suppressor for said switch."

3. In an electrical system, a circuit having a pair of coil-forming conductors arranged in parallel and adapted to be traversed by electric current, one of said conductors being encased in the other and being in close proximity thereto to have a capacitance effect, and a switch in series with one of said conductors for interrupting the flow of current through said conductor while the other conductor is in circuit, said conductors being connected together at a distance therealong from said switch, and said associated conductors forming a spark suppressor for said switch.

4. In an electrical system, a magnetic structure having coil means including a plurality of coils arranged in parallel and with their conductors in close proximity along a substantial portion of their length to provide a capacitance effect, and switch means connected in series with one of said coils for interrupting the flow of current through said coil while the rest of said coil means remains in connected relation in said circuit, said coils forming a spark suppressing means for said switch means.

5. In an electrical system, a circuit having a pair of conductors both adapted to be traversed by electric current flowing in the same direction, said conductors being additive in their magnetic effect and being in close proximity along a substantial portion of their length to have a capacitance effect, and cooperating separable contacts for interrupting the flow of current through one of said conductors while the other conductor is in connected relation in the circuit, said associated conductors forming a spark suppressor for the separable contacts.

6. In an electrical system, a circuit having a pair of conductors both adapted to be traversed by electric current flowing in the same direction, said conductors forming a pair of coils additive in their magnetic effect and being in close proximity along a substantial portion of their length to have a capacitance effect, and cooperating separable contacts for interrupting the flow of current through one of said coils while the other coil is in connected relation in the circuit, said associated coil-forming conductors forming a spark suppressor for the separable contacts.

7. In an electrical system, a dynamo-electric machine having a magnetic structure with two pairs of field coils additive in their magnetic effect, each pair comprising two conductors arranged in close proximity along a substantial portion of their length to have a capacitance effect, the corresponding coils of said pairs being connected in series, and current-interrupting means connected between two of said series-connected coils for varying the energization of the magnetic structure, said associated coils forming a spark-suppressing means for said current-interrupting means.

8. In an electrical system, an electric motor having a series field winding comprising a pair of field coils arranged in parallel and additive in their magnetizing effect, said coils comprising a pair of conductors lying in close proximity over a substantial portion of their length to have a capacitance effect, and speed-responsive switch means for interrupting the current through one of said field coils while the other field coil is in circuit, said associated field coils forming a spark-suppressing means for said switch means.

9. In an electrical system, an electric motor having a series field winding comprising a pair of field coils arranged in parallel and additive in their magnetizing effect, said coils comprising a pair of conductors lying in close proximity over a substantial portion of their length to have a capacitance effect, one of said coils having a lower resistance than the other, and speed-responsive switch means for interrupting the current through the coil of lower resistance while the other field coil is in circuit.

10. In an electrical system, a pair of coil-forming conductors arranged in parallel and adapted to be traversed by electric current flowing in the same direction, one of said conductors being encased in the other and being in close proximity thereto to have a capacitance effect, and means for interrupting the flow of current through one of said conductors while the other conductor is in circuit, said associated conductors forming a spark suppressor for said current-interrupting means.

11. In an electrical system, a pair of conductors arranged in parallel and adapted to be traversed by electric current flowing in the same direction, each of said conductors being of rounded oblong cross-section with a flattened side, the flattened portions of said conductors being in facing relation to provide a capacitance effect, and the assembled pair of conductors forming a cable of generally circular shape in cross-section, and means for interrupting the flow of current through one of said conductors while the other conductor is in circuit, said associated conductors forming a spark suppressor for the current-interrupting means.

12. In an electrical system, an electric motor having a field winding comprising a pair of field coils arranged in parallel and additive in their magnetizing effect, said coils comprising a pair of conductors lying in close proximity over a substantial portion of their length to have a capacitance effect, and speed-responsive switch means for interrupting the current through one of said field coils while the other field coil is in circuit, said associated field coils forming a spark-suppressing means for said switch means.

13. In an electrical system, an electric motor having two sets of field coils arranged in parallel, each set of coils comprising a pair of conductors lying in close proximity to have a capacitance effect, and speed-responsive switch means having two switch units for the respective sets of field coils and for interrupting the current through one of the coils in each set while the other coil in each set is in circuit, said associated field coils forming a spark suppressor for said switch units.

14. In an electrical system, an electric motor having a plurality of more than two field coils arranged in parallel and in additive magnetic relation, said coils comprising a plurality of conductors lying in close proximity to have a capacitance effect, at least two of said conductors paralleling different parts of another of said conductors and forming field coils of fewer turns than said last-named conductor, and speed-responsive switch means for interrupting the current only through the coils of fewer turns, said associated field coils forming a spark suppressor for said switch means.

15. In an electrical system, a circuit having a plurality of more than two coils arranged in parallel and in additive magnetic relation and adapted to be traversed by electric current, said coils comprising a plurality of conductors lying in close proximity to have a capacitance effect, at least two of said conductors paralleling different parts of another of said conductors and forming coils of fewer turns than said last-named conductor, and means for interrupting the current through at least one but less than all of said coils, said associated conductors forming a spark suppressor for said current-interrupting means.

16. In an electrical system, a circuit having coil means consisting of a plurality of more than two coils arranged in parallel and adapted to be traversed by electric current, said coils comprising a plurality of conductors lying in close proximity to have a capacitance effect, at least two of said conductors paralleling different parts of another of said conductor and forming coils of fewer turns than said last-named conductor, and means for interrupting the current through the coils having the fewer turns while the rest of the coil means is in circuit, said associated conductors forming a spark suppressor for said current-interrupting means.

17. In an electrical system, an electric motor having a pair of shunt field coils arranged in parallel and in additive magnetic relation and comprising a pair of conductors lying in close proximity along a substantial portion of their length to have a capacitance effect, and speed-responsive switch means for interrupting the current through one of said coils to govern the speed of the motor, the other field coil being in circuit during the current interruption, said associated field conductors forming a spark suppressor for said switch means.

ROYAL LEE.
FRED E. BROBERG.